United States Patent [19]

Oda et al.

[11] Patent Number: 4,944,786

[45] Date of Patent: Jul. 31, 1990

[54] APPARATUS FOR MANUFACTURING THERMAL PRINT HEAD

[75] Inventors: Goro Oda; Niro Nagata; Yoshitsugu Nakatomi, all of Kanagawa; Takashi Sawafuji, Tokyo; Yoshihisa Shinozaki, Saitama; Eizo Goto, Kanagawa, all of Japan

[73] Assignee: Kabushiki Kaisha Toshiba, Kawasaki, Japan

[21] Appl. No.: 220,064

[22] Filed: Jul. 15, 1988

Related U.S. Application Data

[60] Division of Ser. No. 161,368, Feb. 22, 1988, which is a continuation of Ser. No. 937,483, Dec. 3, 1986, abandoned.

[30] Foreign Application Priority Data

Dec. 26, 1985 [JP] Japan ................................ 60-292044

[51] Int. Cl.[5] ........................ C03B 29/04; C03B 5/02; C03C 27/02

[52] U.S. Cl. .......................................... 65/154; 65/57; 65/59.7; 65/60.5; 65/155; 65/347; 65/DIG. 11; 118/405

[58] Field of Search .................... 65/3.13, 45, 57, 59.7, 65/59.26, 59.28, 60.5, 60.8, 139, 146, 121, 154, 155, 347, DIG. 4, DIG.11; 118/405

[56] References Cited

U.S. PATENT DOCUMENTS

| | | | |
|---|---|---|---|
| 2,165,031 | 7/1939 | Brace | 65/155 |
| 3,524,918 | 8/1970 | Goto | 65/347 X |
| 4,169,426 | 10/1979 | Kornmann et al. | 118/405 X |
| 4,577,588 | 3/1986 | Mautref et al. | 118/405 X |

FOREIGN PATENT DOCUMENTS

| | | | |
|---|---|---|---|
| 548982 | 11/1959 | Belgium | 118/405 |

*Primary Examiner*—Robert L. Lindsay
*Attorney, Agent, or Firm*—Cushman,Darby & Cushman

[57] ABSTRACT

A thermal print head having a base, a glass glaze layer formed on the base by electrically-heated welding, and heating elements formed on the glass glaze layer. A manufacturing method of a thermal print head uses a furnace to accommodate molten glass and a pair of opposed electrodes disposed within the furnace to melt the glass by flowing the current. The method comprises the steps of supplying electric power across the electrodes to cause electric current to flow through glass so as to melt glass, passing an elongated base through the molten glass accommodated in the furnace to form a glass glaze layer on the base, and forming heating elements on the glass glaze layer. Furthermore, an apparatus for forming a glass glaze layer on an elongated base, comprises a furnace having a space to accommodate molten glass therein and a pair of opposed electrodes disposed within the furnace with their opposed faces inclined such that the distance between them is smallest at their upper ends, and the distance increases towards their lower ends. Electric power is supplied across the electrodes. An opening provided at the bottom of the furnace allows the base to be inserted therethrough. A lifting mechanism withdraws the base inserted in the opening after it has passed through the molten glass. A cooling mechanism is provided for cooling the molten glass at the bottom of the furnace.

5 Claims, 5 Drawing Sheets

FIG.4E.'

APPARATUS FOR MANUFACTURING THERMAL PRINT HEAD

This is a division of application Ser. No. 161,368, filed Feb. 22, 1988, which is a continuation of Ser. No. 937,483, filed Dec. 3, 1986, now abandoned.

BACKGROUND OF THE INVENTION

1. Field of the Invention

This invention relates to a thermal print head used in thermal recording systems such as thermal printing, thermal transfer printing or thermal ink jet printing.

This invention also relates to a method of manufacturing the thermal print head in which a thin, fine glass film of a uniform thickness can be formed on a base.

Furthermore, this invention relates to an apparatus for manufacturing the thermal print head in which a base is passed through molten glass to form a glass glaze layer on the base.

2. Description of the Prior Art

A thermal print head usually has a group of heating elements and electrodes on a metal or ceramic base to which a glass glaze has been applied. An example of such a thermal print head is taught in Japanese Utility Model Laid-Open Application No. 57-193545. According to this disclosure, the thickness of the glass glaze should be approximately 100 μm.

The method by which this disclosure teaches the glass coating should be applied to the surface of conventional thermal print heads includes dissolving fine glass powder in water or a binder, coating the surface of the base with this solution, and then baking it at high temperature in an infrared oven or gas furnace.

However, the conventional method has suffered from a number of drawbacks, in that faults such as pinholes were liable to occur in the glass coating, the glass film was too thick, and its adhesive strength was not great, so that it was liable to peel off. These factors shortened the life of the thermal print head.

Of course, melting glass in an electric furnace is also well known as taught in U.S. Pat. No. 3,524,918. However, nowhere in this reference is there any suggestion of using the furnace to apply glass glazes to print heads, or how the furnace could be modified to efficiently process elongated work pieces.

SUMMARY OF THE INVENTION

It is an object of the invention to provide a thermal print head which is constructed such that the problems mentioned above are solved, in which faults are minimal, and which is durable and also cheap.

It is another object of the present invention to provide a thermal print head manufacturing method in which a thin, fine glass film of a uniform thickness can be formed on a base.

According to one aspect of the present invention, there is provided a thermal print head having a base, a glass glaze layer formed on the base using an electrically-heated welding process, and heating elements formed on the glass glaze layer.

Further, according to one aspect of the present invention, a manufacturing method of a thermal print head using electrically-heated welding apparatus having a furnace to accommodate molten glass and a pair of opposed electrodes disposed within the furnace to melt the glass with flowing current, comprises the steps of: supplying electric power across the electrodes to cause electric current to flow through glass so as to melt the glass; passing an elongated base through the molten glass in the furnace to form a glass glaze layer on the base; and forming heating elements on the glass glaze layer.

Furthermore, according to one aspect of the present invention, an apparatus for forming a glass glaze layer on an elongated base, comprises: a furnace having a space to accommodate molten glass therein; a pair of opposed electrodes disposed within the furnace with their opposed faces inclined such that the distance between them is smallest at their upper ends, and the distance increases towards their lower ends, the electrodes extending to the surface of the molten glass; means for supplying electric power across the electrodes; an opening provided at the bottom of the furnace to allow the base to be inserted therethrough; lifting means for withdrawing the base inserted in the opening after passing through the molten glass; and cooling means for cooling the molten glass at the bottom of the furnace.

BRIEF DESCRIPTION OF THE DRAWINGS

These and other objects and advantages of this invention will become more apparent and more readily appreciated from the following detailed description of the presently preferred exemplary embodiments, taken in conjunction with the accompanying drawings, of which.

DETAILED DESCRIPTION OF PREFERRED EMBODIMENTS

One of the preferred embodiments of the present invention will be described with reference to the accompanying drawings.

Figure 1:
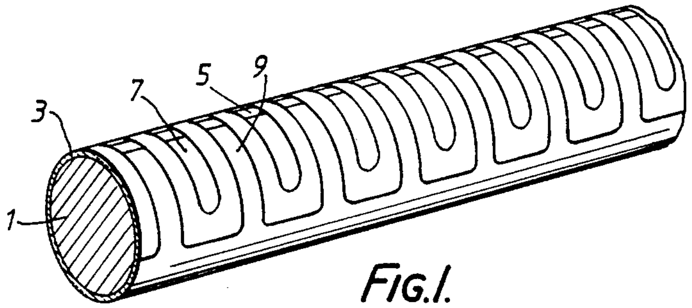
FIG. 1 is a perspective view of an embodiment of a thermal print head according to the present invention.

FIG. 1 shows a thermal print head of the present invention. This thermal print head has a base such as a round rod 1 of copper or molybdenum, a glass glaze layer 3, having a thickness of 20 μm, formed around round rod 1, heating elements 5 formed on glass glaze layer 3, drive electrodes 7 and a common electrode 9 for supplying electric power to heating elements 5. Further, a protection layer (to be described later) is formed on heating elements 5 and electrodes 7 and 9 in order to protect them. Glass glaze layer 3 is formed by bonding molten glass to rod 1, using the dip method (to be described later), by heating a bath of glass by passing an electric current through it. The coefficient of thermal expansion of glass glaze layer 3 should preferably approximate that of rod 1.

Figure 2:
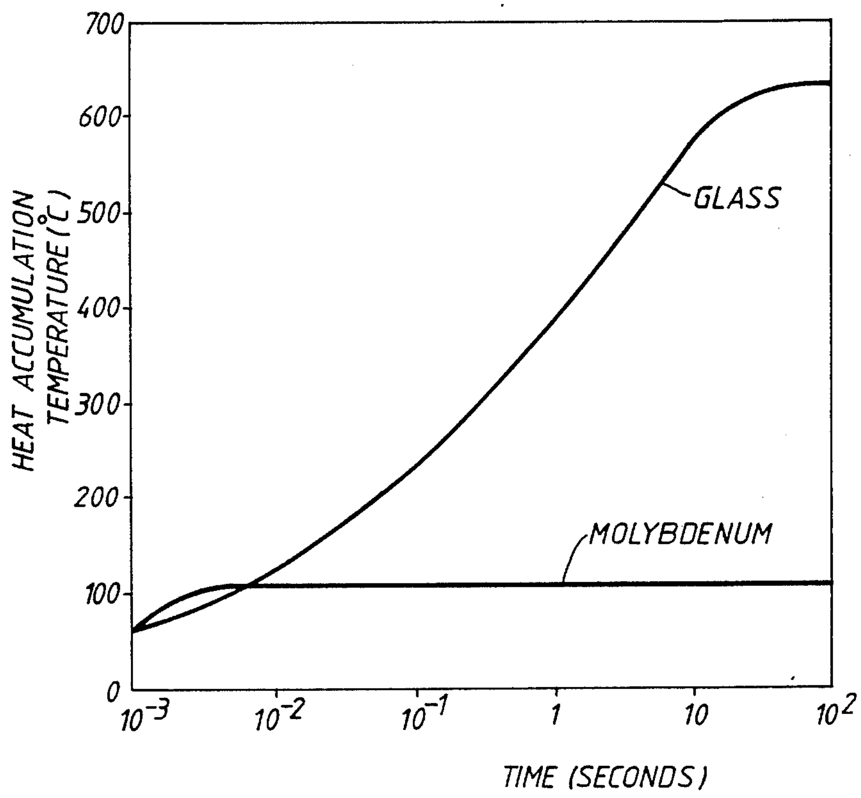
FIG. 2 is a graph showing the heat accumulation temperature characteristics of a thermal print head.

FIG. 2 is a graph, which has been formulated by computer simulation, showing the heat accumulation temperature characteristics of the thermal print head. The horizontal axis represents time (seconds), expressed on a logarithmic scale; the vertical axis, heat accumulation temperature (°C.), expressed linearly. Two types of bases, one of glass and one of molybdenum, are simulated in the experiment. The simulation applied energy to each element at the rate of 1400 erg every 3 msec. The thickness of the heating layer was set at 500 Angstroms, and room temperature was set at 20° C. The heat conductivity of the glass base was set at 0.023 cal/(cm)(sec)(deg), that of the molybdenum base was set at 0.35 cal/(cm)(sec)(deg). The thickness of the glass glaze layer was set at 40 μm. In each case the thermal print head is empty heated, i.e., it is kept from all contact with paper or ink.

As shown in FIG. 2, the temperature of the glass base rose to over 200° C. within one second, and reached approximately 640° C. in 100 seconds. In the case of the molybdenum base, while its initial temperature rise is more rapid than that of the glass base, even after 100 seconds the temperature is stable at about 110° C. As the ink in a thermal ink jet printer boils when the temperature exceeds 200° C., the glass base would present a problem in this respect. The difference in the characteristics of the two bases derives from their heat conductivity. In actual use, the thermal print head would be in contact with paper and ink ribbon, and since heat would be radiated through these media, it would seem that there would be little likelihood of even a glass base breaking, provided empty heating does not continue for a long period. However, when that possibility, however remote, is borne in mind, the desirability of using a base which has better heat conductivity than glass is clear. Copper, molybdenum, aluminum nitride and stainless steel are obviously suitable, and ceramics such as BeO are also satisfactory.

Figure 3:
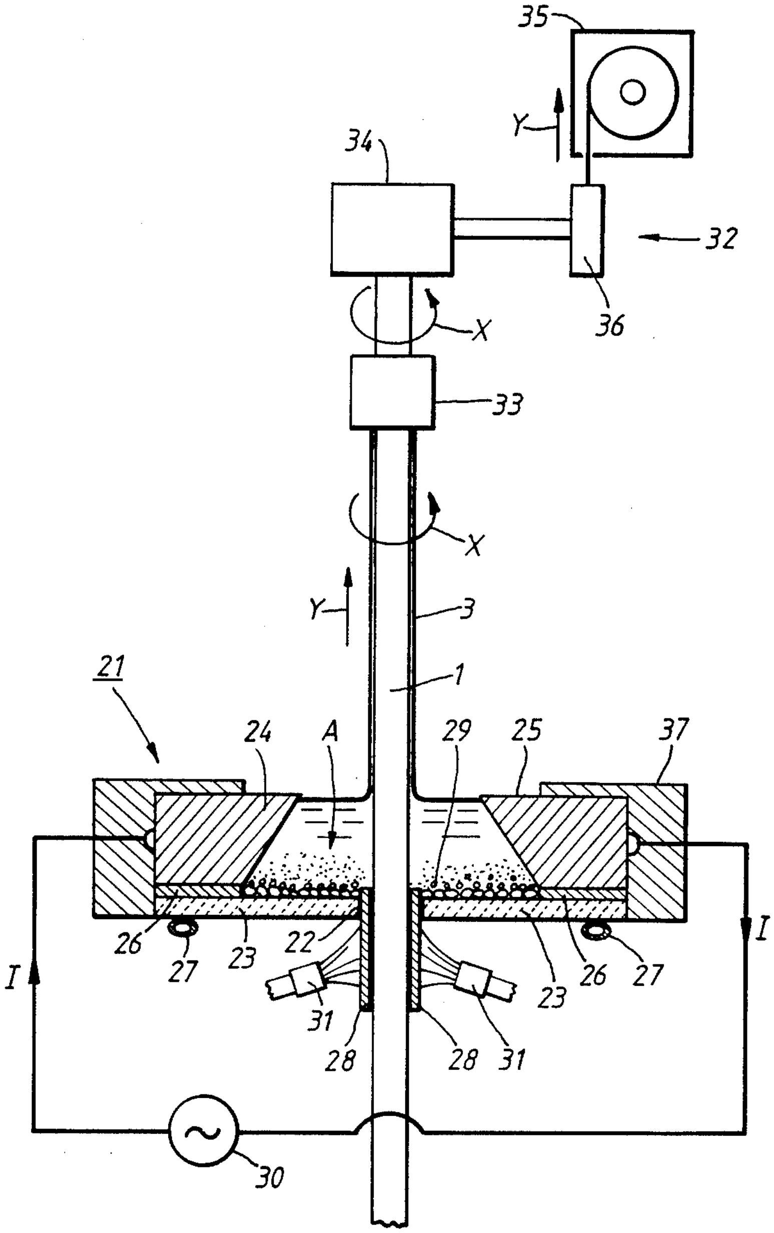
FIG. 3 is a schematic front view showing the construction of an example of the apparatus used to manufacture a thermal print head of the present invention.

FIG. 3 is a diagram of a dip furnace for manufacturing the thermal print head of FIG. 1.

A dip furnace 21 has a copper furnace base 23 with an opening 22, and carbon electrodes 24, 25 mounted on base 23, opposite each other on either side of opening 22. Electrodes 24, 25 and base 23 are insulated from each other by mica 26. Water-cooling pipes 27 mounted underneath base 23, on the opposite sides of the electrodes cool base 23. A guide tube 28 is set in opening 22, such that metal rod 1 of FIG. 1 can be inserted into this guide tube 28 in the upward direction. Electrodes 24 and 25 are surrounded by, and secured in position with, a chamotte 37. Glass 29 to be used for the coating is kept between electrodes 24 and 25. Electrodes 24 and 25 are connected to a constant-current power source 30. When the current I is switched on, electric current passes through glass 29, heating and melting it.

Gas burners 31 are provided close to guide tube 28. These gas burners 31 heat guide tube 28, melting the glass inside it, and thereby facilitating the smooth passage of metal rod 1 as it is inserted into guide tube 28.

A lifting device 32 for withdrawing metal rod 1 is mounted above dip furnace 21. Lifting device 32 comprises a chuck 33 for gripping the top end of metal rod 1, a motor 34 which causes chuck 33 to rotate in the direction of the arrow X, and a motor 35 and pulley 36 which lift motor 34 and chuck 33 in the direction of the arrow Y. This construction has the effect that lifting device 32 lifts metal rod 1 in the axial direction (direction of the arrow Y) while at the same time rotating it in the direction of the arrow X.

The way in which the glass glaze layer is formed, using dip furnace 21 and lifting device 32 constructed as described above, will be explained next.

First, the end of metal rod 1 is inserted into guide tube 28 at the bottom of dip furnace 21 until its top end projects a little way above dip furnace 21 and is gripped by chuck 33.

Next, glass 29 in granular form is supplied to the space A between electrodes 24 and 25, heated to 300°-600° C., and thereby melted, by a gas burner or the like. Electrodes 24 and 25 are then connected to constant-current power source 30. When glass 29 melts, electric current I begins to flow between electrodes 24 and 25, through glass 29. When the current begins to flow, heating by the gas burner is stopped. Once the current has started to flow, the glass, which is in the flow path of the current, is subjected to the thermal energy of this current, so that it continues to melt, despite the fact that heating by the gas burner has been stopped, and as it does so, the current I continues to increase. The space A in dip furnace 21 is formed such that electrodes 24 and 25 approach each other more closely in proportion to the height of the upper surface of the glass liquid: base 23 is cooled by means of water-cooling pipes 27, and since the glass in the vicinity of base 23 tends to become solidified by this cooling, the flow of the current I is concentrated under the surface of the glass liquid, thus ensuring that the glass in the vicinity of under the surface of it is thoroughly melted.

In due course the current stabilizes at the prescribed value, and the glass liquid, particularly in the vicinity of its surface, is kept in a fairly fluid state, at not more than 100 poise.

Base 23, at the bottom of dip furnace 21, is kept constantly cooled by the flow of water through water-cooling pipes 27. This has the effect that the lower part of the glass liquid is cooled by base 23 and thus becomes solid. In this way the glass liquid is insulated from the base of the furnace.

Metal rod 1, which has been inserted through guide tube 28, becomes fixed in this state and cannot move, because of the glass which has been cooled by base 23. Burners 31 are therefore operated, to heat guide tube 28. As opening 22 in the furnace base is heated by this means, the glass which is near it melts, and acts as a kind of lubricant, so that metal rod 1 can be rotated or lifted smoothly in the X direction (direction of rotation) or Y direction (axial direction) respectively. Motors 34 and 35 of lifting device 32 are operated to achieve this rotation and lifting.

As it rotates in the X direction for a predetermined number of revolutions N, metal rod 1 is lifted upwards at the lifting speed V, and a film of glass 3 is formed on the surface of metal rod 1 as it rises. Further, metal rod 1 is oxidized to an appropriate degree by heating before it is inserted into guide tube 28. As metal rod 1 enters guide tube 28, this oxide film is coated over, and therefore protected from more oxidization, by the glass in its immediate vicinity. This increases the bonding strength between the metal rod and the glass as the former is lifted from the upper glass surface. When the bottom end of metal rod 1 enters guide tube 28, the next metal rod is inserted, and the first is lifted above the surface of the glass, thus completing the operation.

A succession of metal rods prepared in advance can be coated with glass in the manner described. The thickness of the glass formed can be controlled by the viscosity of the glass liquid, that is, by the current I supplied to the dip furnace and the lifting speed V. With this kind of dip furnace, the flow of the current is concentrated near the surface of the glass liquid, raising the temperature and lowering the viscosity of the glass near the surface. It is not difficult to form a thin film of the order of 20 μm. If the thickness of the bonding glass is only a very few μm, the glass layer becomes electrically conductive, owing to the effect of the oxides of metal rod 1 having begun to melt into this layer, and this makes it difficult to achieve the desired aim. Since the electrical insulation is improved if the amount of oxides produced is reduced, it does then become possible to make the glass layer thinner. Yet if the film of oxides is made too thin, by reducing the amount of oxides too far, the wetting of the glass is impaired, and faults such as exposed parts are liable to occur in the glass layer. For this reason, at the present time, the preferred thickness of the glass layer is not less than approximately 10 μm. Conversely, if the thickness is several hundred μm or more, the difference in the coefficient of thermal expansion between the glass layer and base might cause the glass layer to come away from the base, so that once again the desired aim cannot be achieved. Preferably, therefore, the thickness of the glass layer should be less than 100 μm.

The purpose of rotating metal rod 1 in the X direction is to obtain a uniform coating of glass. The value of rotational speed N is selected as appropriate, according to the material quality, thickness, etc. of metal rod 1.

Since the glass is heated by the electric current I flowing through the dip furnace, heat is given off in particular by surfaces in contact with the glass liquid. This means that the glass liquid can be wetted reliably in a short time, and that a fine film is obtained, without pinholes. In addition, the provision of opening 22 in base 23 and the arrangement whereby an object is lifted up from this opening through the glass liquid have the effect that long objects can be worked continuously, which reduces the cost.

Further advantages are that since, when metal rod 1 passes through guide tube 28, it is surrounded by glass at a relatively low temperature, excessive oxidation is prevented, and there is no risk of a reduction in insulation resistance or of peeling.

An explanation of a specific embodiment will be given next.

Metal rod 1—round copper rod, 4 mm diameter, 600 mm long, $1.678\times10^{-5}$ coefficient of thermal expansion.

Glass 29—Toshiba solder glass: GS-35N507, $1.13\times10^{-5}$ coefficient of thermal expansion (approximately equal to that of rod 1).

Glass 29 is placed in dip furnace 21, and a glass liquid bath (size, 60 mm×50 mm, depth 20 mm) is prepared. A current (I=20A) is passed through this glass.

When, after these preparations, metal rod 1 is lifted through the glass at a lifting speed V of 4 cm/min. while being rotated (N=twice/min.), a uniform glass film of thickness 25 μm is formed over a length of 300 mm on the middle portion of the metal rod.

A uniform glass film also can be formed on the metal rod as same as above when metal rod 1 and glass 29 are used as follows.

Metal rod 1—round molybdenum rod, 4 mm diameter, 600 mm long, $5.5\times10^{-6}$ coefficient of thermal expansion.

Glass 29—Toshiba solder glass: GS-35N518, $4.8\times10^{-6}$ coefficient of thermal expansion (approximately equal to that of rod 1).

The two ends of metal rod 1 must be cut off, since for operational reasons the preheating and lifting conditions affecting them are not constant, and the uniform central part only used as the thermal print head.

A sample coated with glass in the manner described above is subjected to a heat cycle test, ted five times, in which it is steeped for five minutes alternately in liquid nitrogen and boiling water. No faults such as cracking or peeling were observed in the glass film. Nor did the glass film come away even when metal rod 1 is bent to a certain degree.

Figure 5:
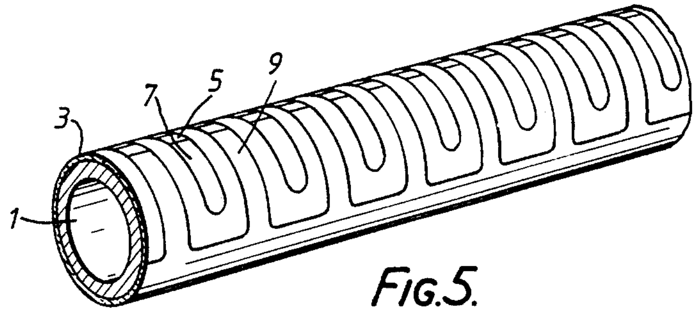
FIG. 5 represents an embodiment having a tubular base.
Figure 6:
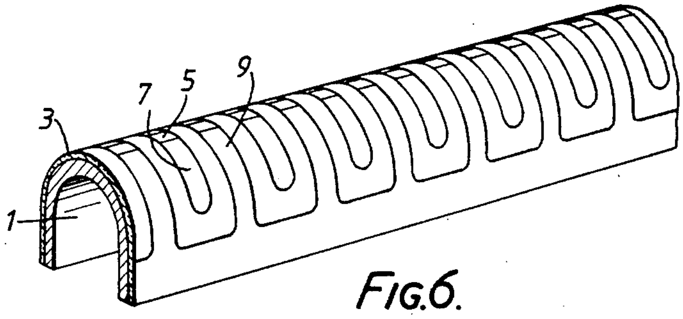
FIG. 6 represents an embodiment having a base shaped as a reversed gutter.

Apart from copper, metal rod 1 to which the coating is applied can be of other metals with relatively good heat conductivity, such as aluminum nitride, molybdenum or stainless steel, or it may be of ceramic, for example BeO. Nor is its shape restricted to a solid round rod such as that of the embodiment described above. As long as a base has at least a convex portion, it may be tubular as shown in FIG. 5, or reversed gutter-shaped as shown in FIG. 6.

The glass to be used for the coating may be selected for its suitability to the material to be coated. As long as the thickness of the film does not exceed some tens of microns, as in the case of the film prepared in the embodiment described above, it will stand up to use without peeling even if there is a quite considerable difference between the coefficients of thermal expansion. There is thus the advantage that glass of good workability can be selected.

After the glass glaze layer has been formed on the metal rod by means of the dip furnace depicted in FIG. 3, heating elements are formed on the metal rod by the process described below. FIGS. 4A through 4I and 4E′ provide an outline of this process.

Figure 4A:
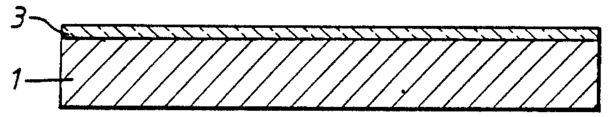
FIGS. 4A through 4I and 4E' are schematic sectional views showing the process of manufacturing.

FIG. 4A shows the state when glass glaze layer 3 has been formed on metal rod 1 as a base. This corresponds to the state when the rod is lifted from the dip furnace of FIG. 3.

Figure 4B:
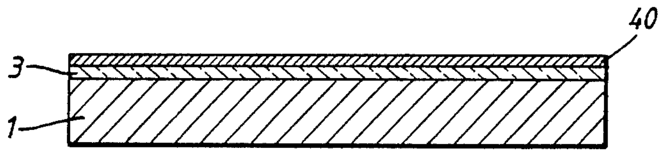

Next, a thin film heating element layer 40 consisting of nichrome (NiCr) or titanium oxide (TiO) is formed on glass glaze layer 3 by the known methods of evaporation or sputtering (FIG. 4B). The thickness of this layer 40 is approximately 500 Angstroms.

Figure 4C:
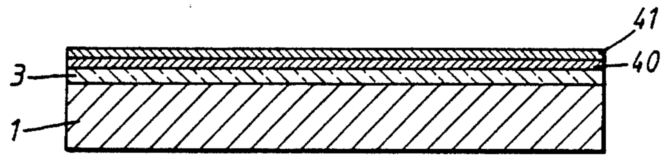

After the formation of heating element layer 40, a copper layer 41 is formed on heating element layer 40, again by evaporation or sputtering (FIG. 4C). This copper layer 41 subsequently becomes lead electrodes i.e., drive electrodes 7 and common electrode 9.

Figure 4D:
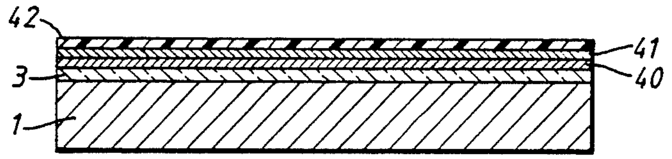
Figure 4E:
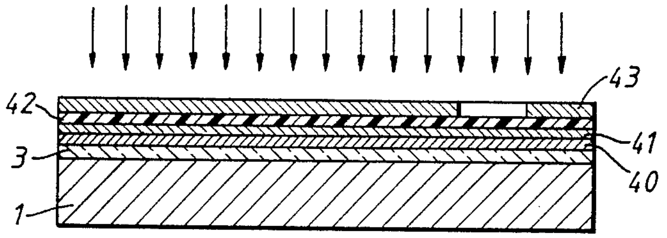

When copper layer 41 has been formed, a resist layer 42 is formed on it (FIG. 4D).

Figure 4F:
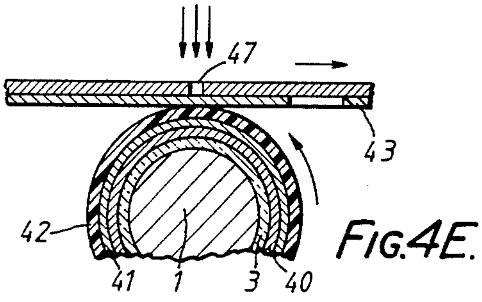
Figure 4F:
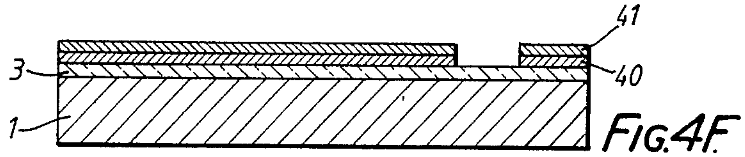
Figure 4G:
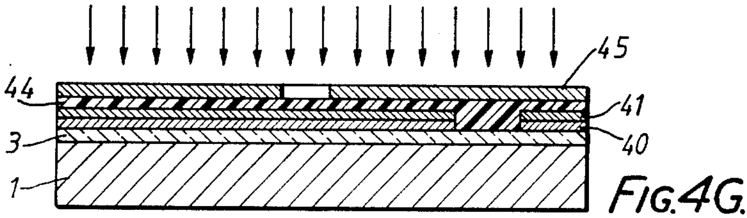

Next, a pattern film 43 is superimposed on resist layer 42, which is then irradiated with light such as ultra-violet rays (FIG. 4E), after which the pattern of drive electrodes 7 and common electrodes 9 are formed by means of etching, dissolving the exposed parts (FIG. 4F). The exposure of round rod base 1 to light (FIG. 4E) is effected by the process shown in FIG. 4E′, whereby round rod base 1 is rolled in the direction shown by the arrow while at the same time a slit 47 provided in the upper part of film 43 is moved at the same speed and the pattern on film 43 is thereby transferred.

Figure 4H:
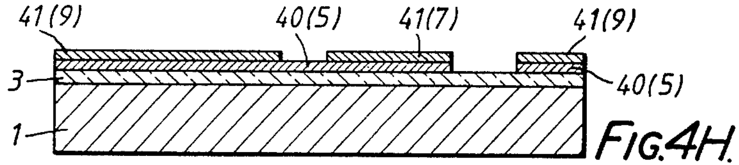
Figure 4I:
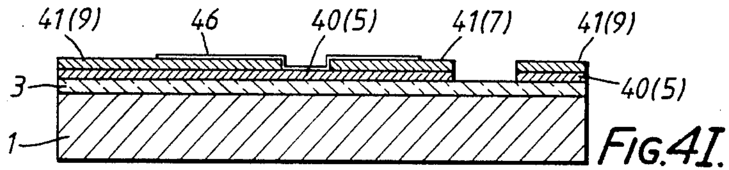

The above-mentioned pattern is then coated with a resist layer 44, and the parts where heating elements 5 are to be formed are exposed selectively by means of light from above a pattern film 45 (FIG. 4G), after which heating elements 5 are formed by means of etching, dissolving the copper of the exposed parts (FIG. 4H). The rod, with heating elements 5 formed on it, is then washed and dried.

Next, a protective layer 46 consisting of silicon nitride (SiN) or silicon carbide (SiC) is formed on the surface by means of PCVD (plasma chemical vapor deposition), thus completing the manufacture of this thermal print head.

Since as explained above the apparatus used for manufacturing the invention has an opening provided on the base of the dip furnace through which the base is inserted, long linear, cylindrical or strip-shaped material can be worked. And since, further, the base is drawn up through molten glass which has been heated by the passage of electric current through it, a thin, fine glass film or coating can be formed over a long part of the base.

Additional advantages are that since the object being worked (base) is surrounded by glass in the vicinity of the opening in the dip furnace base at a relatively low temperature and excessive oxidation is thereby prevented, the oxide film and the glass film are intimately bonded, and the glass film formed on the surface of the base will not easily come off and has excellent electrical insulation properties. Further, because the base is moved up through the opening provided in the base of the dip furnace and past the level of the electrically heated molten glass, long objects in linear, rod or strip form can be passed in succession and at a prescribed speed through the electrically heated molten glass, so that a thin, fine glass film of a uniform thickness can be formed without difficulty over a wide area of the object being worked, workability is excellent, and the finished product is both durable and of low cost. The adoption of the invention therefore makes it possible to provide a thermal print head with minimal faults which is both durable and cheap.

Although only a few exemplary embodiments of this invention have been described in detail above, those skilled in the art will readily appreciate that many modifications are possible in the preferred embodiments without materially departing from the novel teachings and advantages of this invention. Accordingly, all such modifications are intended to be included within the scope of this invention as defined by the following claims.

What is claimed is:

1. An apparatus for forming a glass glaze layer on an elongated base, comprising:

- a furnace having a space to accommodate molten glass therein;
- a pair of opposed electrodes disposed within said furnace with their opposed faces inclined such that the distance between them is smallest at their upper ends, and said distance increases towards their lower ends, said electrodes extending to the surface of the molten glass;
- means for supplying electric power across the electrodes;
- said furnace defining an opening provided at the bottom of said furnace to allow the base inserted therethrough parallel to the direction of elongation of the base;
- means for withdrawing the base inserted in said opening as the base passes through the molten glass, said withdrawing means including:
- means for gripping the top end of the base,
- means for rotating said gripping means, and
- means for lifting said rotating means and gripping means upward; and
- means for cooling the molten glass at the bottom of said furnace.

2. An apparatus according to claim 1, further comprising:

- a guide tube provided at the opening to guide the base inserted therein; and
- means for heating said guide tube to facilitate the smooth passage of the base inserted into said guide tube.

3. An apparatus for forming a glass glaze layer on an elongated base, comprising:

- a furnace having a space to accommodate molten glass therein and having a bottom, the furnace defining an opening provided at the bottom;
- a pair of opposed electrodes disposed within the furnace;
- means for supplying electric power across the electrodes to cause electric current to flow through the glass so as to melt the glass; and
- means for moving an elongated base through the molten glass to coat the elongated base with the glass, the moving means including means for withdrawing the elongated base inserted in the opening as the elongated base passes through the molten glass, and also including means for rotating the elongated base while the base is moved in the molten glass by the withdrawing means.

4. An apparatus according to claim 3, wherein the furnace includes means for cooling the molten glass at the bottom.

5. An apparatus according to claim 4, wherein the furnace includes:

- a guide tube provided at the opening to guide the elongated base inserted therein; and
- means for heating the guide tube to facilitate the smooth passage of the elongated base inserted into the guide tube.

* * * * *